Jan. 1, 1935.　　　W. H. BAUCH　　　1,986,180

TENSIONING DEVICE

Filed Aug. 23, 1933

Inventor,
William H. Bauch,
By
Attorneys.

Patented Jan. 1, 1935

1,986,180

UNITED STATES PATENT OFFICE 1,986,180

TENSIONING DEVICE

William H. Bauch, Shelbyville, Ind., assignor to Pembroke W. Cornelius, Indianapolis, Ind., doing business under the name and style of Cornelius Engineering Company Application August 23, 1933, Serial No. 686,417

1 Claim. (Cl. 271—2.3)

Figure 1:
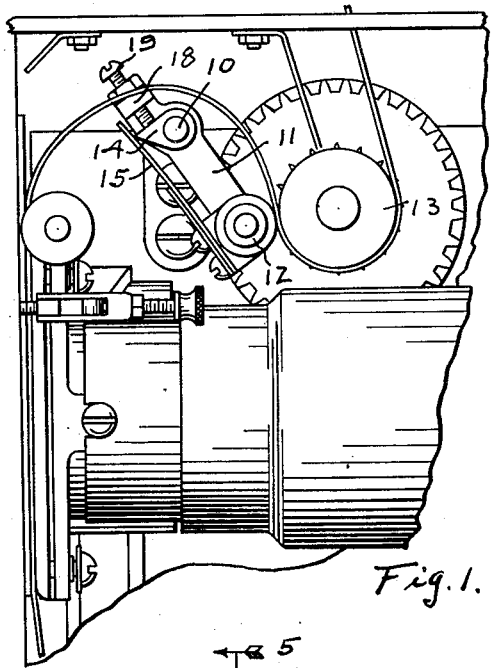
Figure 2:
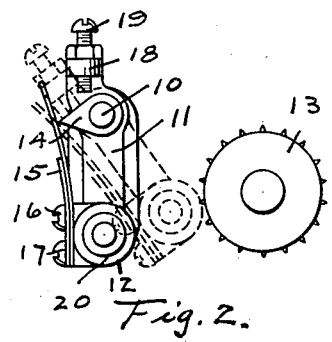
Figure 3:
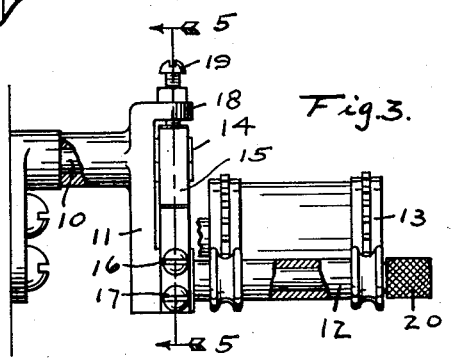
Figure 4:
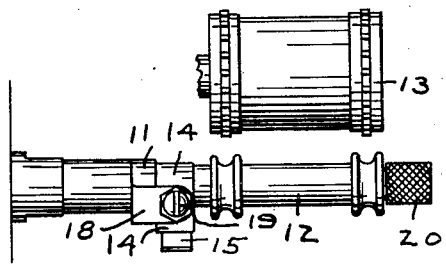

This invention relates to a tensioning device here shown as being applied in a motion picture projecting machine to press a film toward a driving spool. A primary object of the invention is to provide such a structure as will occupy the minimum amount of space so as to be self-contained and at the same time permit the inclusion of an adjustable stop whereby the pressing member is limited in movement particularly in one direction of travel. In many devices, such for example as in the motion picture projector the assembly space within which such a device may be mounted is extremely limited particularly where the structure is to be incorporated in a portable machine which must necessarily be restricted in size. It has been common practice heretofore to employ a spring to tend to urge a pressure member in one direction and to mount this spring on a member independent of the pressure member and independent of the pressure member support, all of which structure necessarily required the use of considerable space. The full purport and advantages of my invention will be better understood by the following description of one particular form thereof as illustrated by the accompanying drawing, wherein Fig. 1 is a side elevation of a structure embodying my invention as applied to a motion picture projector machine;

Fig. 2, a side elevation with the pressure member in a retracted position;

Fig. 3, a rear elevation;

Fig. 4, a top plan view, and

Figure 5:
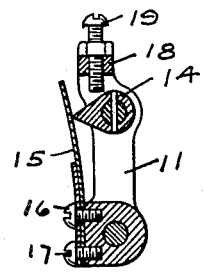

Fig. 5, a longitudinal vertical section on the line 5—5 in Fig. 3.

Like characters of reference indicate like parts throughout the several views in the drawing.

Referring to Fig. 1 of the drawing, my invention is shown as being applied to a motion picture projector wherein the structure embodying my invention is mounted adjacent the film feeding spool and from which spool a loop is provided to give slack for the intermittent drive as is customarily employed in such machines. I mount a post 10 to be fixed in position and rockably hang on the post an arm 11. A roller 12 is here shown as being revolubly carried by the lower end of the arm 11 to swing toward and away from the driving spool 13.

A cam 14 is fixed in position on the outer end of the post 10 and incidently prevents the lateral shifting of the arm 11 outwardly on the post 10. A leaf spring 15 has one end secured, here shown as by the two screws 16 and 17, to the lower end of the arm 11 to extend upwardly therealong to have the free end bear compressively against the nose of the cam 14. The upper end of the arm 11 carries an ear 18 extending outwardly over the cam 14 but in spaced relation therefrom and screw-threadedly carries a screw 19 which is of sufficient length to be carried on through the ear 18 into contact with the cam 14.

The cam 14 is suitably mounted on the shaft 10 so that when the arm 11 is swung about the shaft, the spring 15 will be caused to ride around over the nose of the cam 14 to distort the spring from its normal tendency to remain in a straight position and thereby yieldingly resist movement of the arm in that direction, as indicated in Fig. 2. A knurled grip 20 is here shown as being provided on the shaft carrying the roller 12 as a means for shifting the arm 11 back against the increasing pressure of the spring 15. To limit the arc of travel of the arm 11, the screw 19 is adjusted so that it will bear against the side of the nose of the cam when the lower end of the arm 11 has been returned to the desired position, the screw 19 thereby stopping the travel of the arm in that returned direction, as indicated in Fig. 1. Preferably the cam 14 has a rather sharp nose as shown in the drawing and is sufficiently extended from the axis of the shaft 10 to cause the required distortion of the spring 15.

It is thus to be seen that I produced a novel structure wherein the spring setting up the applied pressure is carried by the swinging member itself and not by any removed member. Furthermore the cam which causes the distortion of the spring is carried directly upon the member about which the pressure member arm swings.

While I have herein shown and described my invention in the one best form as now known to me, it is obvious that structural changes may be employed without departing from the spirit of the invention and I therefore do not desire to be limited to that precise form beyond the limitations as may be imposed by the following claim.

I claim:

In a web feeding means, the combination with a roller carrying a web, of a swingably mounted roller adapted to carry the web toward the roller, a post, an arm rockably supported by the post to have a portion of the arm above and below the post, said roller being revolubly carried on the arm below the post, a cam fixed on the post, a leaf spring fixed by its lower end to said arm below the post to press by its upper end against the cam, said cam having a projecting nose against which the spring rides as the arm is rocked, and an adjustable stop on the upper end of the arm in the path of said cam nose limiting travel of the arm in one direction under pressure of the spring.

WILLIAM H. BAUCH.